United States Patent Office 3,240,668
Patented Mar. 15, 1966

3,240,668
COMPOSITIONS AND METHOD OF CONTROLLING PESTS WITH THIO AND DITHIOPHOSPHORIC ACID DERIVATIVES
Kurt Rüfenacht, Basel, Switzerland, assignor to
J. R. Geigy A.G., Basel, Switzerland
No Drawing. Filed Apr. 2, 1965, Ser. No. 445,228
Claims priority, application Switzerland, Oct. 5, 1961,
11,581/61
6 Claims. (Cl. 167—33)

This application is a continuation-in-part of my patent application Serial No. 228,235, filed October 4, 1962, now abandoned, and of my patent application Serial No. 269,882, filed April 2, 1963, as a continuation-in-part of said earlier filed application.

The present invention concerns pest control agents which contain new thio and dithiophosphoric acid derivatives as active ingredients, and also processes for the control of pests using such active ingredients and the agents containing them.

The thio and dithiophosphoric acid derivatives according to my invention have the general formula

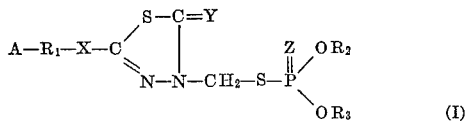

(I)

wherein

Each of X, Y and Z is either oxygen or a sulfur atom,
$R_1$ is an alkylene radical or one to four carbon atoms,
A is hydrogen or alkoxy with one to four carbon atoms, or alkylthio with one to four carbon atoms, and
Each of $R_2$ and $R_3$ is an alkyl radical with one to three carbon atoms.

According to another features of the invention, A–$R_1$ is the benzyl radical; according to a further feature of my invention, A–$R_1$ is the tetrahydrofurfuryl radical, and according to yet another feature of my invention, A–$R_1$ is allyl.

It has been found that, surprisingly, the abovedescribed novel compounds which are distinguished particularly by the combination of the 1,3,4-thiadiazol nucleus and an oxygen or sulfur atom linking the carbon atom in 5-position of the said nucleus to the above defined A–$R_1$ radical, have excellent insecticidal, acaricidal and nematocidal properties and are thus suitable as active ingredients in pest control agents, particularly as contact or stomach poisons.

When the compounds of Formula I are compared with those known compounds the structure of which is distinguished by having in lieu of the A–$R_1$–X substituent of Formula I an alkyl or a benzyl radical or the like substituent bonded directly to the carbon atom in 5-position of the thiadiazole ring, i.e. not via a sulfur or oxygen atom as is the case in the compounds of Formula I, it is particularly surprising that the insecticidal and acaricidal properties of the compounds of Formula I are about equal or even better than those of the known compounds in spite of the fact that the novel compounds possess a lower mammalian toxicity, the $DL_{50}$ values being ten times higher than those of the aforesaid known compounds. It would have been expected that such marked decrease in mammalian toxicity would be accompanied by a comparable decrease in insecticidal and/or acaricidal activities.

The alkyl radicals with maximally 4 carbon atoms, constituted by A–$R_1$ in which A is hydrogen, comprise the methyl, ethyl, n-propyl, isopropyl, n-butyl, isobutyl and t-butyl radicals, among which the methyl, ethyl and isopropyl radicals are preferred.

Alkyl radicals $R_2$ and $R_3$ with maximally three carbon atoms are methyl, ethyl, n-propyl and isopropyl, of which methyl and ethyl are preferred. $R_2$ and $R_3$ are preferably identical.

Other suitable radicals exemplifying A–$R_1$ are the methoxy-methyl, ethoxyethyl, ethoxymethyl, propoxymethyl, propoxyethyl, propoxypropyl, isopropoxmethyl, isopropoxyethyl, isopropoxypropyl, methylthiomethyl and ethylthiomethyl radical.

To produce the active substance of the general Formula I, a heterocyclic halogen methyl derivative of the formula

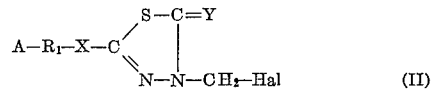

(II)

wherein Hal is chlorine or bromine and A–$R_1$–, X and Y have the meanings given in Formula I, is reacted, preferably in the presence of an acid binding agent, with a thio or dithiophosphoric acid derivative of the general Formula III

(III)

wherein $R_2$, $R_3$ and Z have the meanings given in Formula I, or it is reacted with a salt of such a thio or dithiophosphoric acid derivative.

The following new halogenomethyl derivatives of thiadiazol compounds are given as examples of starting materials of the general Formula II:

3-halogenomethyl-5-methoxy-1,3,4-thiadiazol-2(3H)-one or -thione,
3-halogenomethyl-5-ethoxy-1,3,4-thiadiazol-2(3H)-one or -thione,
3-halogenomethyl-5-propoxy-1,3,4-thiadiazol-2(3H)-one or -thione,
3-halogenomethyl-5-isopropoxy-1,3,4-thiadiazol-2(3H)-one or -thione,
3-halogenomethyl-5-butoxy-1,3,4-thiadiazol-2(3H)-one or -thione,
3-halogenomethyl-5-methylthio-1,3,4-thiadiazol-2(3H)-one or -thione,
3-halogenomethyl-5-ethylthio-1,3,4-thiadiazol-2(3H)-one or -thione,
3-halogenomethyl-5-propylthio-1,3,4-thiadiazol-2(3H)-one or -thione,
3-halogenomethyl-5-isopropylthio-1,3,4-thiadiazol-2(3H)-one or -thione,
3-halogenomethyl-5-butylthio-1,3,4-thiadiazol-2(3H)-one or -thione,
3-halogenomethyl-5-(methoxy-methylthio)-1,3,4-thiadiazol-2(3H)-one or -thione,
3-halogenomethyl-5-(ethoxy-methylthio)-1,3,4-thiadiazol-2(3H)-one or -thione,
3-halogenomethyl-5-(propoxy-methylthio)-1,3,4-thiadiazol-2(3H)-one or -thione,
3-halogenomethyl-5-(isopropoxy-methylthio)-1,3,4-thiadiazol-2(3H)-one or -thione,
3-halogenomethyl-5-(β-methoxy-ethoxy)-1,3,4-thiadiazol-2(3H)-one or -thione,
3-halogenomethyl-5-(β-ethoxy-ethoxy-)-1,3,4-thiadiazol-2(3H)-one or -thione,
3-halogenomethyl-5-(β-methoxy-propoxy)-1,3,4-thiadiazol-2(3H)-one or -thione,
3-halogenomethyl-5-(γ-ethoxy-propoxy)-1,3,4-thiadiazol-2(3H)-one or -thione,
3-halogenomethyl-5-(γ-propoxy-propoxy)-1,3,4-thiadiazol-2(3H)-one or -thione,
3-halogenomethyl-5-(β-isopropoxy-ethoxy)-1,3,4-thiadiazol-2(3H)-one or -thione, 3-halogenomethyl-5-(β-methylthio-ethoxy)-1,3,4-thiadiazol-2(3H)-one or -thione,
3-halogenomethyl-5-(β-methylthio-ethylthio)-1,3,4-thiadiazol-2(3H)-one or -thione.

The reactions of compound II with compound III can be performed in water or organic solvents such as, e.g. acetone, butanone, methanol, ethanol, acetic acid ethyl ester, acetonitrile or benzene, at room temperature or moderately raised temperatures, preferably between 20–80° C. In the reactions when free acids are used, both alkali metal hydroxides or alkali metal carbonates and also tertiary amines can be used as acid binding agents and, if salts are a reaction component, the alkali metal salts or ammonium salts are used.

Starting materials of the general Formula II are obtained for example, by reacting correspondingly substituted 1,3,4-thiadiazol-2(3H)-ones or -thiones of the general Formula IV

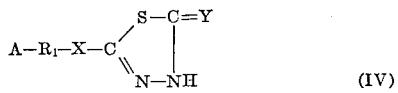

wherein A–R₁, X and Y have the meanings given above, with formaldehyde and then treating the 3-hydroxymethyl derivatives obtained with thionyl chloride, phosphorus tribromide or phosphorus pentachloride.

The heterocyclic compounds of general Formula IV are obtained in the known way from the corresponding thiocarbazic acid esters (monothiocarbazic acid-O-ester or dithiocarbazic acid ester) by reaction with phosgene or with carbon disulfide in the presence of potassium hydroxide.

Examples of thiophosphoric acid and dithiophosphoric acid derivatives of the general Formula III are the O,O-dimethyl thiophosphoric acid, O,O-diethyl thiophosphoric acid, O,O-diisopropyl thiophosphoric acid, O,O-dimethyl dithiophosphoric acid, O,O-diethyl dithiophosphoric acid and O,O-diisopropyl dithiophosphoric acid.

Depending on the intended method of application, the new active substances produced according to the invention can be combined with suitable carriers and/or distributing agents to form dusts, suspensions, emulsions or solutions which ensure a fine distribution of the active substances on the plants and other substrata to be protected from attack by insects and/or mites and ticks.

Usually a composition according to the invention is formed from a major portion of an agriculturally useful carrier, and a minor portion, in an effective amount, of a compound of the formula

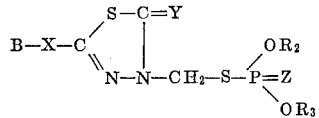

wherein B is either A—R₁—, or benzyl or tetrahydrofurfuryl,
A is either hydrogen, or alkoxy with maximally 4 carbon atoms or alkylthio with maximally 4 carbon atoms,
R₁ is an alkylene radical having from 1 to 4 carbon atoms,
Each of X, Y and Z is, independently, sulfur or oxygen, and
Each of R₂ and R₃ is an alkyl radical with maximally 3 carbon atoms.

Dusts suitable for the use of the active substances according to the invention can be produced, e.g. by mixing or milling together the active substances with a solid carrier. carrier. As such talcum, diatomaceous earth, kaolin, bentonite, calcium carbonate, boric acid or tricalcium phosphate can be employed. On the other hand, the substances can be drawn onto the carriers by means of a volatile solvent.

To produce emulsions, the active substances as such or after solution in organic solvents such as, e.g. xylene, can be emulsified in water which contains a surface active substance. For practical application however, it is generally advantageous to produce concentrates first by combining liquid active substances with surface active substances or by combining solid or liquid active substances with inert organic solvents and surface active substances, which concentrates in their turn are monophase systems, ie.. solutions, or polyphase systems, and can be worked up to form ready-for-use emulsions with water. As surface active substances both cation active substances such as e.g. quaternary ammonium salts, anion active substance such as e.g. soap, soft soap, salts of long chained aliphatic sulfuric acid monoesters, salts of long chained alkoxyacetic acids and of aliphatic-aromatic sulphonic acids, and as non-ionogenic surface active substances, e.g. polyethylene glycol ethers of fatty alcohols or of dialkyl phenols and polycondensation products of ethylene oxide can be employed.

Solvents suitable for the production of emulsion concentrates are, e.g. cyclic hydrocarbons such as benzene, toluene or, particularly, xylene, also ketones such as acetone, butanone, cyclohexanone or methyl cyclohexanone.

Suspensions can be obtained by suspending wettable powders in water. Such wettable powders are produced by combining solid active substances with surface active substances or by combining solid or liquid active substances with solid pulverulent carriers and surface active substances.

In addition, the active substances produced according to the invention can also be dissolved in organic solvents, e.g. in chlorinated hydrocarbons such as trichloroethylene or in medium petroleum fractions, if necessary with the addition of auxiliary solvents such as acetone or higher ketones. Finally, the active substances can also be applied by distribution in the air in the form of aerosol, smoke or mist, in particular in storerooms or greenhouses.

To increase the duration of action, in some circumstances it is advantageous to add suitable epoxides as stabilisers to the active substances before or after they are combined with the carriers. Thus, substances such as, e.g. epichlorohydrin, cyclohexene oxide, styrene oxide and glycide ethers such as 1-phenoxy-2,3-epoxypropane or 1,β-naphthoxy-2,3-epoxypropane, increase the stability of the active substances according to the invention in a surprising manner in spite of the fact that here they cannot serve to bind hydrogen chloride as there are no aliphatically bound chlorine atoms present to cause liberation of hydrogen chloride. The stabilisation of the active substances usable according to the invention by means of epoxide compounds thus forms a further subject of the present invention.

If desired, the biological action of the agents according to the invention can be broadened by the admixture of other insecticidal active substances such as, e.g. hexachlorocyclohexane, dichlorodiphenlytrichloroethane, chlorinated camphene, calcium arsenate, (p-nitrophenyl)-diethyl thiophosphate, (3-chloro-4-nitrophenyl)-dimethyl thiophosphate, 2-isopropyl - 4-methylpyrimidyl-(6)-diethyl thiophosphate, (β,β-dichlorovinyl)-dimethyl phosphate, (α-hydroxy-β,β,β-trichloroethyl)-phosphonic acid dimethyl ester or S-(1,2-dicarboethoxyethyl)-O,O-dimethyl dithiophosphate, of acaricidal or fungicidal substances such as e.g. S-(4-chlorophenylthiomethyl)-O,O-diethyl dithiohosphate, S-(2,5-dichlorophenylthiomethyl)-O,O,-diethyl-dithiophosphate or N-trichloromethane sulfenyl tetrahydrophthalimide, methane sulfone-N-trichloromethane sulfenyl-p-chloroanilide or sulfur, or of nematocidal or herbicidal substances.

The following examples serve to further illustrate but not to limit the invention. Parts are given therein as parts by weight unless stated otherwise, and their relationship to parts by volume is as that of grams to cubic centimeters. Temperatures are in degrees centigrade. Pressures are given in torr (=mm. Hg).

Example 1

(a) 148 parts of 5-methylthio-1,3,4-thiadiazol-2(3H)-one (Guha and Guha, J. Ind. Chem. Soc. 4, 239 (1927)), and 150 parts by volume of an about 37% aqueous formaldehyde solution are heated until a clear solution is formed. 300 parts of water are then added to this mixture whereupon the 3-hydroxymethyl derivative separates as an oily phase. On injection of a seed crystal this phase crystallizes. The white crystals of 5-methylthio-$\beta$-hydroxymethyl-1,3,4-thiadiazol-2(3H)-one which precipitate melt at 79–80°.

A solution of 98 parts of this 3-hydroxymethyl compound in 200 parts by volume of chloroform is quickly added to a well cooled solution of 100 parts of thionyl chloride in 200 parts by volume of chloroform. The mixture is refluxed for 1 hour. The easily volatile components are then distilled off in a water jet vacuum at a bath temperature at 40–50° and the residue is fractionated under high vacuum. The 3-chloromethyl-5-methylthio-1,3,4-thiadiazol-2(3H)-one obtained is a pale yellow oil and boils at 110°/0.8 torr.

(b) 25 parts of the potassium salt of O,O-diethyl dithiophosphoric acid are dissolved in 100 parts by volume of acetone. 20 parts of 3-chloromethyl-5-methylthio-1,3,4-thiadiazol-2(3H)-one are added dropwise to this solution whereupon the temperature rises to 34°. The mixture is then stirred for 4 hours at room temperature and then 100 parts of water are added. The acetone is then distilled off in vacuo at a bath temperature of about 40° whereupon an oil separates which is taken up in ether. The ether solution is washed with dilute sodium bicarbonate solution and water. The ether is then evaporated off; a yellow oil is obtained as residue; it is O,O-diethyl-S-[5-methylthio - 1,3,4 - thiadiazol-2(3H)-onyl-(3)-methyl]-dithiophosphate. Molecular distillation shows a boiling point of 140°/0.1 torr (pale yellow oil).

Example 2

(a) According to Example 1a the 3-chloromethyl-5-ethyl-thio-1,3,4-thiadiazol-2(3H)-one is obtained from 5-ethylthio-1,3,4-thiadiazol-2(3H)-one (M.P. 42–43°) via the hydroxymethyl compound (M.P. 46–47°) as a colourless oil showing a boiling point of 89–90°/0.1 torr.

(b) 35 parts of the potassium salt of O,O-dimethyl-dithiophosphoric acid and 31 parts of 3-chloromethyl-5-ethylthio-1,3,4-thiadiazol-2(3H)-one are dissolved in 150 parts by volume of acetone. This mixture is stirred for 18 hours at room temperature, 150 parts of water are then added thereto and the product is worked up analogously to Example 1b. The O,O-dimethyl-S-[5-ethylthio-1,3,4-thiadiazol-2(3H)-onyl-(3)-methyl]-dithiophosphate is obtained as a pale yellow oil. On molecular distillation it boils colourless at 135°/0.3 torr.

Example 3

(a) The 3-hydroxymethyl compound (M.P. 57–59°) is obtained according to Example 1a from 176 parts of 5 - isopropylthio-1,3,4-thiadiazol-2(3H)-one (M.P. 67–68°) and 280 parts by volume of a 37% aqueous formaldehyde solution. From this product the pale yellow 3-chloromethyl - 5 - isopropylthio-1,3,4-thiadiazol-2(3H)-one is obtained according to Example 1a, distilling at 116–118°/0.1 torr.

(b) 62 parts of the ammonium salt of O,O-dimethyl-monothiophosphoric acid and 67 parts of 3-chloromethyl-5-isopropyl-thio-1,3,4-thiadiazol-2(3H)-one are dissolved in 300 parts by volume of acetone and then heated for 6 hours at 60°. The acetone is then distilled off in a water jet vacuum at a bath temperature of about 40° and the residue is suspended with 100 parts by volume of an about 10% aqueous sodium carbonate solution. The separated oil is taken up in ether. After drying and evaporating the ether, a pale yellow oil is obtained, which consists essentially of O,O-dimethyl-S-[5-isopropylthio-1,3,4-thiadiazol-2(3H)-onyl-(3)-methyl]-thiophosphate. It turns colourless on molecular distillation at 140°/0.005 torr.

Example 4

(a) 192 parts of crude, oily 5-($\beta$-methoxyethylthio)-1,3,4-thiadiazol-2(3H)-one, obtained according to Guha and Guha, loc. cit. and 31 parts of paraformaldehyde are stirred for 2 hours at 90°. A clear melt is formed. After cooling, the so-obtained 3-hydroxymethyl compound is dissolved in 300 parts by volume of chloroform and this solution is then quickly added to a mixture, cooled to −10°, consisting of 170 parts of thionyl-chloride and 340 parts by volume of chloroform. After heating for 2 hours under reflux, the product is worked up analogously to Example 1a. The pale yellow 3-chloromethyl-5-($\beta$-methoxyethylthio)-1,3,4-thiadiazol-2(3H)-one is obtained by distillation at 131–133°/0.1 torr.

(b) 38 parts of the ammonium salt of O,O-diethyl-monothiophosphoric acid and 36 parts of 3-chloromethyl-5 - ($\beta$-methoxyethylthio)-1,3,4-thiadiazol-2(3H)-one are dissolved in 150 parts by volume of acetone and heated for 6 hours at 60°. The product is then worked up analogously to Example 1b. The O,O-diethyl-S-[5-($\beta$-methoxy - ethylthio) - 1,3,4-thiadiazol-2(3H)-onyl-(3)-methyl] - thiophosphate is obtained as a brown oil, which turns colourless on molecular distillation at 145°/0.02 torr.

Example 5

(a) 174 parts of 5-allylthio-1,3,4-thiadiazol-2(3H)-one (pale yellow oil; boiling point 137–138°/0.03 torr) are converted into 3-chloromethyl-5-allylthio-1,3,4-thiadiazol-2(3H)-one according to Example 4a.

(b) 33 parts of 3-chloromethyl-5-allylthio-1,3,4-thiadiazol-2(3H)-one and 38 parts of potassium salt of O,O-diethyldithiophosphoric acid are dissolved in 150 parts by volume of acetone according to Example 1b. The so-obtained O,O-diethyl - S - [5-allylthio-1,3,4-thiadiazol-2(3H)-onyl-(3)-methyl]-dithiophosphate is a yellow oil, which turns colourless on molecular distillation at 140°/0.01 torr.

Example 6

(a) 132 parts of 5-methoxy-1,3,4-thiadiazol-2(3H)-one (M.P. 113–114°, produced by phosgenation of thiocarbazic acid-O-methylester) and 130 parts by volume of an about 37% aqueous formaldehyde solution are heated until a clear solution is formed. 130 parts of a 5% aqueous sodium carbonate solution, cooled to 0°, are then added to this mixture whereupon it crystallises by scratching with a glass rod. The so-obtained 3-hydroxymethyl compound melts at 84–86°. The 3-chloromethyl-5-methoxy-1,3,4-thiadiazol-2(3H)-one distilling at 78°/0.1 torr is produced according to Example 1a.

(b) 32 parts of 3-chloromethyl-5-methoxy-1,3,4-thiadiazol-2(3H)-one are added dropwise to a solution of 40 parts of potassium salt of O,O-dimethyl-dithiophosphoric acid in 200 parts by volume of methanol. The temperature rises temporarily to 35°. The mixture is then stirred for 4 hours at room temperature and 100 parts of water are then added. The methanol is then distilled off essentially in a water jet vacuum at a bath temperature of about 35° and then worked up analogously to Example 1b. The so-obtained O,O-dimethyl-S-[5-methoxy-1,3,4-thiadiazol - 2(3H) - onyl - (3) - methyl]-dithiophosphate forms a colourless oil. On molecular distillation it boils at 130°/0.0001 torr.

Example 7

(a) 5-ethoxy - 1,3,4 - thiadiazol-2(3H)-one (M.P. 85–86°; produced by phosgenation of thiocarbazic acid-O-ethyl ester) is reacted analogously to the method described in Example 1 by way of the 3-hydroxymethyl derivative (M.P. 79–80°) to form the 3-chloromethyl compound, B.P. 90°/0.1 torr, M.P. 64–66°.

(b) 46 parts of the potassium salt of O,O-dimethyl dithiophosphoric acid and 39 parts of 3-chloromethyl-5-ethoxy-1,3,4-thiadiazol-2(3H)-one are dissolved in 200 parts by volume of acetone. This mixture is stirred for 18 hours at room temperature and then the product is worked up analogously to Example 1. The O,O-dimethyl-S-(5-ethoxy-1,3,4-thiadiazol - 2(3H) - onyl-3-methyl)-dithiophosphate obtained is crystalline; after re-crystallization from methanol, it melts at 49–50°.

O,O-diethyl-S-(5-ethoxy - 1,3,4 - thiadiazol-2(3H)-onyl-3-methyl)-dithiophosphate is obtained in the same way as a colorless oil. On molecular distillation it boils at 120°/0.3 torr.

Example 8

(a) 160 parts of 5-isopropoxy-1,3,4-thiadiazol-2(3H)-one (M.P. 65–66°, produced by phosgenation of thiocarbazic acid-O-isopropylester) and 100 parts by volume of an about 37% aqueous formaldehyde solution are heated at 50°, whereupon a clear solution is formed. 400 parts of cold water are added to this solution and the separated oil is taken up in ether. After drying and distilling off the ether, the hydroxymethyl compound is obtained as an oil. This oil is then added to a solution, cooled to −10°, consisting of 170 parts of thionylchloride in 500 parts by volume of chloroform, and the product is then worked up analogously to Example 4a. The obtained 3-chloromethyl-5-isopropoxy-1,3,4-thiadiazol - 2(3H)-one distills at 88°/0.15 torr.

(b) 100 parts by volume of an aqueous solution containing 25 parts of potassium salt of O,O-diethyl-dithiophosphoric acid and 21 parts of 3-chloromethyl-5-isopropoxy-1,3,4-thiadiazol-2(3H)-one are stirred thoroughly for 2 hours at 60°. After cooling, the oily phase is taken up in ether. The product is then worked up analogously to Example 1b and the O,O-diethyl-S-[5-isopropoxy-1,3,4-thiadiazol-2(3H) - onyl - (3) - methyl]-dithiophosphate is obtained as a colourless oil, which boils on molecular distillation at 130°/0.004 torr.

Example 9

(a) According to Example 8 the 3-chloromethyl-5-n-propoxy-1,3,4-thiadiazol-2(3H)-one is obtained from 5-n-propoxy-1,3,4-thiadiazol-2(3H)-one (boiling point 108–110°/0.2 torr; M.P. 26–28°) via the hydroxymethyl compound (M.P. about 40°) as a colourless oil (boiling point 92–93°/0.05 torr).

(b) 21 parts of 3-chloromethyl-5-n-propoxy-1,3,4-thiadiazol-2(3H)-one, 30 parts of O,O-diethyl-dithiophosphoric acid and 25 parts of non-aqueous potassium carbonate are heated for 4 hours under reflux with a water trap in 200 parts by volume of benzene. After cooling, 50 parts of water are added to the solution, the layers are separated and the benzene phase is washed with water and dried. After distilling off the benzene, the O,O-diethyl-S-[5 - n-propoxy-1,3,4-thiadiazole-2(3H)-onyl-(3)-methyl]-dithiophosphate is obtained as a pale yellow oil, which turns colourless on molecular distillation at 140°/0.05 torr.

Example 10

(a) 174 parts of crude 5-n-butoxy-1,3,4-thiadiazol-2(3H)-one (nondistillable, M.P. about 25–30°, produced by phosgenation of thiocarbazic acid-O-n-butylester) and 31 parts of paraformaldehyde are stirred thoroughly for 1 hour at 90°. A clear melt is formed. After cooling, the so-obtained hydroxymethyl compound is dissolved in 200 parts by volume of chloroform. This solution is added to a solution, cooled to −10°, consisting of 170 parts of thionylchloride in 340 parts by volume of chloroform. The 3-chloromethyl-5-n-butoxy-1,3,4-thiadiazole-2(3H)-one is obtained analogously to Example 4a as a colourless, viscous oil, showing a boiling point of 101–103°/0.08 torr.

(b) 9 parts of pyridine are added dropwise to a solution of 22 parts of 3-chloromethyl-5-n-butoxy-1,3,4-thiadiazol-2(3H)-one and 25 parts of O,O-diethyl-dithiophosphoric acid in 200 parts by volume of benzene, whereupon the temperature rises to 35–40°. After heating for 10 minutes under reflux and cooling, 25 parts of water are added thereto, the layers are separated and the benzene phase is washed with diluted sodium carbonate solution, water, diluted hydrochloric acid and then again with water. After drying and distilling off the benzene, the O,-O - diethyl-S-[5-n-butoxy-1,3,4-thiadiazol - 2(3H) - onyl-(3)-methyl]-dithiophosphate is obtained as a yellow oil, which turns colourless on molecular distillation at 140°/0.003 torr.

Example 11

(a) According to Example 4a the 3-chloromethyl-5-(β-methoxy-ethoxy) - 1,3,4 - thiadiazol - 2(3H)-one distilling at 117–119°/0.3 torr. is obtained from 5-(β-methoxyethoxy) - 1,3,4 - thiadiazol-2(3H)-one (boiling point 126°/0.1 torr; produced by phosgenation of thiocarbazic acid-O-(β-methoxy-ethyl)-ester).

(b) 35 parts of the ammonium salt of O,O-diethyl-monothiophosphoric acid and 34 parts of 3-chloromethyl-5-(β-methoxyethoxy) - 1,3,4 - thiadiazol - 2(3H)-one are heated for 4 hours at 70° in 150 parts by volume of acetonitrile. After cooling, 150 parts of water are added thereto, the acetonitrile is distilled off essentially in a water jet vacuum and the product is worked up analogously to Example 1b. The so-obtained O,O-diethyl-S-[5-(β-methoxyethoxy) - 1,3,4 - thiadiazol - 2(3H)-onyl-(3)-methyl]-thiophosphate is a brown oil, which boils on molecular distillation at 140°/0.005 torr.

Example 12

(a) According to Example 1a the non-distillable 3-chloromethyl-5-benzyloxy-1,3,4-thiadiazole - 2(3H) - one, which crystallises after a certain time, is obtained from 5-benzyloxy-1,3,4-thiadiazol-2(3H) - one (M.P. 77–79°) via the hydroxymethyl compound (M.P. 80–85°).

(b) The O,O-diethyl-S-[5-benzyloxy-1,3,4-thiadiazole-2(3H)-only-(3)-methyl]-dithiophosphate is obtained analogously to Example 1b as a yellow, non-distillable oil from 25 parts of 3-chloromethyl - 5 - benzyloxy - 1,3,4-thiodiazol - 2(3H)-one and 25 parts of potassium salt of O,O-diethyl-dithiophosphoric acid.

Example 13

(a) According to Example 8a the non-distillable-3-chloromethyl - 5 - tetrahydrofuryl - (2′) - methoxy-1,3,4-thiadazol-2(3H)-one is obtained from 5-tetrahydrofuryl-(2′)-methoxy-1,3,4-thiadiazol - 2(3H) - one (M.P. 78–80°). After reaction with the potassium salt of O,O-diethyl-dithiophosphoric acid according to Example 1b the O,O-diethyl - S - [5-tetrahydrofuryl-(2′)-methoxy-1,3,4-thiadiazol-2(3H)-onyl-(3)methyl]-dithiophosphate is obtained as a brownish yellow, non-distillable oil.

Example 14

(a) According to Example 1a the 3-chloromethyl-5-allyloxy-1,3,4-thiadiazol-2(3H)-one distilling at 108°/0.3 torr is obtained as a pale yellow oil from 5-allyloxy-1,3,4-thiadiazol - 2(3H)-one (M.P. 61–62°; produced by phosgenation of thiocarbazic acid-O-allylester) via the hydroxy-methyl compound.

(b) 11 parts of triethylamine are added dropwise to a solution of 21 parts of 3-chloromethyl-5-allyloxy-1,3,4-thiadiazol - 2(3H)-one and 25 parts of O,O-diethyl-dithiophosphoric acid in 150 parts by volume of acetic acid ethylester, whereupon the temperature rises quickly to 40°. The mixture is then heated under reflux, cooled and then worked up analogously to Example 10b. The obtained O,O-diethyl-S-[5-allyloxy-1,3,4-thiadiazol - 2(3H)-onyl-(3)-methyl]dithiophosphate is a yellow oil, which turns colourless on molecular distillation at 130°/0.002 torr.

Example 15

(a) 148 parts of crude 5-methoxy-1,3,4-thiadiazole-2(3H)-thione (obtained from thiocarbazic acid-O-methylester by treatment with carbondisulfide and alcoholic potassium lye; M.P. 91–92°) and 150 parts by volume of an about 37% aqueous formaldehyde solution are heated to form a clear solution, which is then cooled off and 300 parts of water are added whereby an oil is separated. After adding 40 parts by volume of 10% aqueous sodium carbonate solution, a hydroxymethyl compound is obtained in crystalline form.

210 parts of phosphoric pentachloride are suspended in 500 parts by volume of non-alcoholic chloroform. While cooling well at a temperature not execeding 5°, a solution of 178 parts of crude 3-hydroxymethyl-5-methoxy-1,3,4-thiadiazole-2(3H)-thione in 500 parts by volume of non-alcoholic chloroform are added dropwise. The mixture is stirred for 24 hours at room temperature. A flocky precipitation is separated by filtration and all volatile parts are distilled away in a water jet vacuum at a bath temperature of 30°. The residue is then stirred with 600 parts of cold water, the separated oil is taken up in ether; the ether solution is washed with sodiumbicarbonate solution and with water and then dried and distilled in ether. By distillation in high vacuum, the 3-chloromethyl-5-methoxy-1,3,4-thiadiazole-2(3H)-thione, boiling at 97–100°/0.06 torr is obtained as a pale yellow oil.

(b) According to Example 3b the O,O-dimethyl-S-[5-methoxy-1,3,4-thiadiazole-2(3H)-thion-3-ylmethyl]-thiophosphate is obtained as a yellow brownish oil from 52 parts ammonium salt of O,O-dimethyl-monothiophosphoric acid and from 49 parts to 3-chloromethyl-5-methoxy-1,3,4-thiadiazole-2(3H)-thione in 250 parts by volume of acetone. It is distilled into pale yellow by molecular distillation at 125°/0.0002 torr.

Example 16

(a) According to Example 15a, the non-distillable 3-chloromethyl-5-ethoxy-1,3,4-thiadiazole-2(3H)-thione is obtained as a yellow, thick liquid oil from 5-ethoxy-1,3,4-thiadiazole-2-(3H)-thione (M.P. 129–130°) over the crystallized hydroxymethyl compound (M.P. 82–83°). According to Example 1b, the reaction with the potassium salt of O,O-diethyl-dithiophosphoric acid results in O,O-Diethyl S-[5-ethoxy-1,3,4-thiadiazole-2(3H)-thion-3-ylmethyl]-dithiophosphate. A yellow oil is formed which distills on molecular distillation at 140°/0.05 torr.

Example 16A 53 parts of 5-ethylthio-1,3,4-thiadiazole-2(3H)-thione (M.P. 125–126°; according to Busch and Biehler, loc. cit.) are heated with 530 parts by volume of a 37% aqueous formaldehyde solution until a clear solution is formed. Then it is cooled off to room temperature and 450 parts of water and 100 parts of an about 10% aqueous sodiumcarbonate solution are added. The separated oil is absorbed by ether. After drying and distilling off the ether, the 3-chloromethyl-5-ethylthio-1,3,4-thiadiazole-2(3H)-thione is obtained according to Example 15a; a yellow, non distillable oil is formed. By adding the potassium salt of O,O-diethyl-S-[5-ethylthio-1,3,4-thiadiazole-2(3H)-thion-3-ylmethyl]-dithiophosphate is obtained; this forms a yellow oil, which distills on molecular distillation at 140°/0.01 torr.

Example 17

(a) According to Example 15a, an oily hydroxymethyl compound is obtained from 176 parts of 5-isopropoxy-1,3,4-thiadiazole-2(3H)-thione (M.P. 99–100°), 600 parts by volume of formaldehyde solution, 880 parts of water and 200 parts by volume of sodiumcarbonate solution; then it is isolated by shaking out with ether and according to Example 15a, it is turned into 3-chloromethyl-5-isopropoxy-1,3,4-thiadiazole-2(3H)-thione; this forms a yellow, non distillable oil.

(b) By reaction of the above, crude 3-chloromethyl-5-isopropoxy-1,3,4-thiadiazole-2(3H)-thione with potassium salt of O,O-dimethyl-dithiophosphoric acid a yellow, non distillable oil is obtained, consisting mostly of O,O-dimethyl-S-[5-isopropoxy-1,3,4-thiadiazole-2(3H)-thion-3-ylmethyl]-dithiophosphate.

Example 18

49 parts of 5-methylthio-1,3,4-thiadiazole-2(3H)-thione [Busch u. Biehler, Journ. prakt. Chem. 93, 339 (1916)], are heated with 150 parts by vloume of a 37% aqueous formaldehyde solution until a clear solution is formed. Then it is cooled off to room temperature and added to 300 parts by volume of a well mixed 10% aqueous sodiumcarbonate solution. The hydroxymethyl compound being crystalline is isolated by filtration (M.P. 62–65°).

According to Example 15a, the crude 3-chloromethyl-5-methylthio-1,3,4-thiadiazole-2(3H)-thione is obtained by reacting with $PCl_5$ as a yellowish, non distillable oil. By further adding potassium salt of O,O-diethyl-dithiophosphoric acid (according to Example 1b), O,O-diethyl-S-[5-methylthio-1,3,4-thiadiazole-2(3H)-thion-3-ylmethyl]-dithiophosphate is obtained. This forms a yellow oil which distills on molecular distillation at 140°/0.008 torr.

Further compounds of the Formula I, listed in the following table, have been prepared according to the preceding examples:

| | A—R$^1$ | R$_2$ and R$_3$ | X | Y | Z | B.P./mol dist. |
|---|---|---|---|---|---|---|
| 1 | CH$_3$ | CH$_3$ | S | O | S | 130°/0.1 torr. |
| 2 | CH$_3$ | CH$_3$ | S | O | O | 135°/0.06 torr. |
| 3 | CH$_3$ | C$_2$H$_5$ | S | O | O | 135°/0.1 torr. |
| 4 | C$_2$H$_5$ | C$_2$H$_5$ | S | O | S | 140°/0.03 torr. |
| 5 | C$_2$H$_5$ | CH$_3$ | S | O | O | 140°/0.03 torr. |
| 6 | C$_2$H$_5$ | C$_2$H$_5$ | S | O | O | 140°/0.03 torr. |
| 7 | iso-C$_3$H$_7$ | CH$_3$ | S | O | S | 140°/0.015 torr. |
| 8 | iso-C$_3$H$_7$ | C$_2$H$_5$ | S | O | S | 140°/0.005 torr. |
| 9 | iso-C$_3$H$_7$ | C$_2$H$_5$ | S | O | O | 140°/0.005 torr. |
| 10 | CH$_3$OCH$_2$CH$_2$ | CH$_3$ | S | O | S | 145°/0.02 torr. |
| 11 | CH$_3$OCH$_2$CH$_2$ | C$_2$H$_5$ | S | O | O | 140°/0.01 torr. |
| 12 | CH$_2$—CHCH$_2$ | CH$_3$ | S | O | S | 140°/0.01 torr. |
| 13 | CH$_2$—CHCH$_2$ | CH$_3$ | S | O | O | 140°/0.01 torr. |
| 14 | CH$_2$—CHCH$_2$ | C$_2$H$_5$ | S | O | O | 140°/0.01 torr. |
| 15 | CH$_3$ | C$_2$H$_5$ | O | O | S | 130°/0.2 torr. |
| | R$_1$ | | | | | |
| 16 | CH$_3$ | CH$_3$ | O | O | O | 125°/0.0001 torr. |
| 17 | CH$_3$ | C$_2$H$_5$ | O | O | O | 130°/0.0001 torr. |
| 18 | C$_2$H$_5$ | C$_2$H$_5$ | O | O | S | 120°/0.03 torr. |
| 19 | C$_2$H$_5$ | CH$_3$ | O | O | O | 125°/0.06 torr. |
| 20 | C$_2$H$_5$ | C$_2$H$_5$ | O | O | O | 140°/0.2 torr. |
| 21 | iso-C$_3$H$_7$ | CH$_3$ | O | O | S | 130°/0.004 torr. |
| 22 | iso-C$_3$H$_7$ | CH$_3$ | O | O | O | 125°/0.004 torr. |
| 23 | iso-C$_3$H$_7$ | C$_2$H$_5$ | O | O | O | 130°/0.004 torr. |
| 24 | n-C$_3$H$_7$ | CH$_3$ | O | O | S | 140°/0.05 torr. |
| 25 | n-C$_3$H$_7$ | CH$_3$ | O | O | O | 140°/0.05 torr. |
| 26 | n-C$_3$H$_7$ | C$_2$H$_5$ | O | O | O | 140°/0.05 torr. |
| 27 | n-C$_4$H$_9$ | CH$_3$ | O | O | S | 140°/0.003 torr. |
| 28 | n-C$_4$H$_9$ | CH$_3$ | O | O | O | 140°/0.003 torr. |
| 29 | n-C$_4$H$_9$ | C$_2$H$_5$ | O | O | O | 140°/0.003 torr. |
| 30 | CH$_3$OCH$_2$CH$_2$ | CH$_3$ | O | O | S | 140°/0.005 torr. |
| 31 | CH$_3$OCH$_2$CH$_2$ | C$_2$H$_5$ | O | O | O | 130°/0.0005 torr. |
| 32 | CH$_2$—CHCH$_2$ | CH$_3$ | O | O | S | 130°/0.002 torr. |
| 33 | CH$_2$—CHCH$_2$ | C$_2$H$_5$ | O | O | O | 130°/0.002 torr. |
| 34 | CH$_3$ | CH$_3$ | O | S | S | 120°/0.0005 torr. |
| 35 | CH$_3$ | C$_2$H$_5$ | O | S | S | 125°/0.0005 torr. |
| 36 | CH$_3$ | C$_2$H$_5$ | O | S | O | 125°/0.0005 torr. |
| 37 | iso-C$_3$H$_7$ | C$_2$H$_5$ | O | S | S | 140°/0.02 torr. |

The following examples illustrate the production of some typical pest control agents according to the invention.

Example I 1 part of the active substance obtained as described in Example 6 above is mixed in a ball mill with 99 parts of the carrier talcum and milled finely in a mill to form a dust.

In the same fashion, two active dusts are prepared using 99 parts each, of bentonite and of calcium carbonate, respectively.

Example II 25 parts of the active substance obtained as described in Example 7 above are dissolved in 60 parts of xylene and 15 parts of an ethylene oxide condensation product of alkyl phenols are added. A corresponding part of the xylene is also replaced by 2.5 parts of epichlorohydrin to form a similar solution. On mixing the so obtained solution each separately, with 500 and 2000 times the amount of water respectively, ready-for-use emulsions are obtained.

*Example III*

20 parts of the active substance No. 1 in the above table and 20 parts of kieselguhr, 5 parts of magnesium carbonate, 47.5 parts of kaolin, 5 parts of a solid alkanol sulfonic acid-ethylene oxide condensation product are finely milled and produce a wettable powder, which on suspending in water, provides ready-for-use sprays. A similar wettable powder is obtained when calcium carbonate replaces magnesium carbonate.

*Example IV*

1–2 parts of the active substance No. 2 in the above table are dissolved in 10 parts by volume of isopropanol and this solution is mixed with 89–88 parts by volume of a petroleum fraction boiling between 180–220° whereupon a highly effective insecticidal solution is obtained which can be sprayed well.

The following examples are some illustrations of applications of some compounds, according to this invention, to pests and show the remarkable results obtained therewith, but there is no intention to limit the invention thereto.

*Example V*

10 mg. O,O - dimethyl - S[5-methoxy-1,3,4-thiadiazol-2(3H)-onyl-(3)-methyl]-thiophosphate dissolved in acetone were put into a Petri dish and, after evaporation of the solvent, 20 domestic flies were put into the dish; after 22 minutes all flies were in the dorsal position, which shows the excellent contact-insecticidal action of this compound. An analogously good action was obtained when grain weevils were used instead of domestic flies.

*Example VI*

DDT-resistant Colorado beetle larvae were placed on the stems of potato plants which had been previously sprayed with a 1% emulsion of O,O-diethyl-S-[5-methylthio - 1,3,4-thiadiazol-2(3H)-only-(3)-methyl]-thiophosphate. After 18 minutes, all larvae which had eaten from the potato plants were immobilised and died afterwards.

*Example VII*

Bean leaves infested by adults, larvae and nymphs of the common red spider (*Tetranychus urticae*) were sprayed with a 1% aqueous emulsion of O,O-dimethyl-S-[5 - methoxy - 1,3,4-thiadiazole-2(3H)-thion-3-ylmethyl]-dithiophosphate. After 6 days, all spiders, larvae and nymphs had been killed.

What is claimed is:

1. A composition of matter which comprises a major proportion of an agriculturally useful carrier, and a minor proportion in a pesticidally effective amount of a compound of the formula

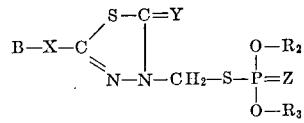

wherein

B is a member selected from the group consisting of A—R₁—, benzyl, tetrahydrofurfuryl and allyl, A is a member selected from the group consisting of hydrogen, alkoxy with maximally 4 carbon atoms, and alkylthio with maximally 4 carbon atoms, R₁ is an alkylene radical having from 1 to 4 carbon atoms, each of X, Y and Z is, independently, a member selected from the group consisting of sulfur and oxygen, and each of R₂ and R₃ is alkyl of maximally 3 carbon atoms.

2. A method of controlling pests which comprises contacting said pests with a composition comprising a carrier and a pesticidal quantity of a compound of the formula

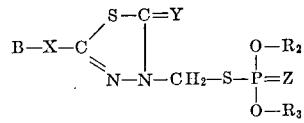

wherein

B is a member selected from the group consisting of A—R₁—, benzyl, tetrahydrofurfuryl and allyl, A is a member selected from the group consisting of hydrogen, alkoxy with maximally 4 carbon atoms, and alkylthio with maximally 4 carbon atoms, R₁ is an alkylene radical having from 1 to 4 carbon atoms, each of X, Y and Z is, independently, a member selected from the group consisting of sulfur and oxygen, and each of R₂ and R₃ is alkyl of maximally 3 carbon atoms.

3. A composition of matter which comprises a major proportion of an agriculturally useful carrier, and a minor proportion in a pesticidally effective amount of a compound of the formula

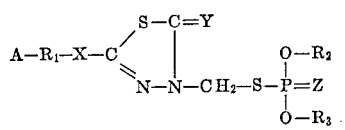

wherein each of X, Y and Z is, independently, a member selected from the group consisting of sulfur and oxygen;

R₁ is an alkylene radical having from 1 to 4 carbon atoms;

A is a member selected from the group consisting of hydrogen, alkoxy of maximally 4 carbon atoms and alkylthio of maximally 4 carbon atoms, and each of R₂ and R₃ is an alkyl radical with maximally 3 carbon atoms.

4. A composition of matter which comprises a major proportion of an agriculturally useful carrier, and a minor proportion in a pesticidally effective amount of a compound of the formula

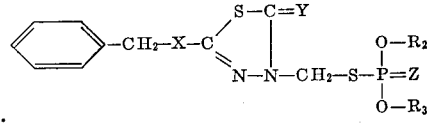

wherein each of X, Y and Z is, independently, a member selected from the group consisting of sulfur and oxygen, and each of R₂ and R₃ is an alkyl radical with maximally 3 carbon atoms.

5. A composition of matter which comprises a major proportion of an agriculturally useful carrier, and a minor proportion in a pesticidally effective amount of a compound of the formula

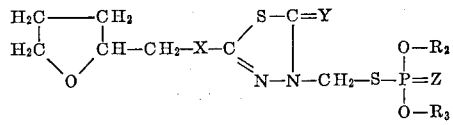

wherein each of X, Y and Z is, independently, a member selected from the group consisting of sulfur and oxygen, and each of R₂ and R₃ is an alkyl radical with maximally 3 carbon atoms.

6. A composition of matter which comprises a major proportion of an agriculturally useful carrier, and a minor proportion in a pesticidally effective amount of a compound of the formula

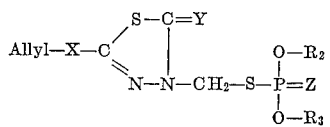

wherein each of X, Y and Z is, independently, a member selected from the group consisting of sulfur and oxygen, and each of $R_2$ and $R_3$ is an alkyl radical with maximally 3 carbon atoms.

References Cited by the Examiner
UNITED STATES PATENTS

| | | | |
|---|---|---|---|
| 2,516,313 | 7/1950 | Goddin et al. | 167—33 |
| 2,784,196 | 3/1957 | Bacchetti | 260—306.7 |
| 2,912,357 | 11/1959 | Harmon et al. | 167—33 |
| 2,940,980 | 6/1960 | Lopresti et al. | 260—306.7 |

OTHER REFERENCES

Kosalopoff: "Organophosphorus Compounds" (New York, 1950), page 240.

JULIAN S. LEVITT, *Primary Examiner.*